INVENTOR
JOSEPH J. CONNOLLY

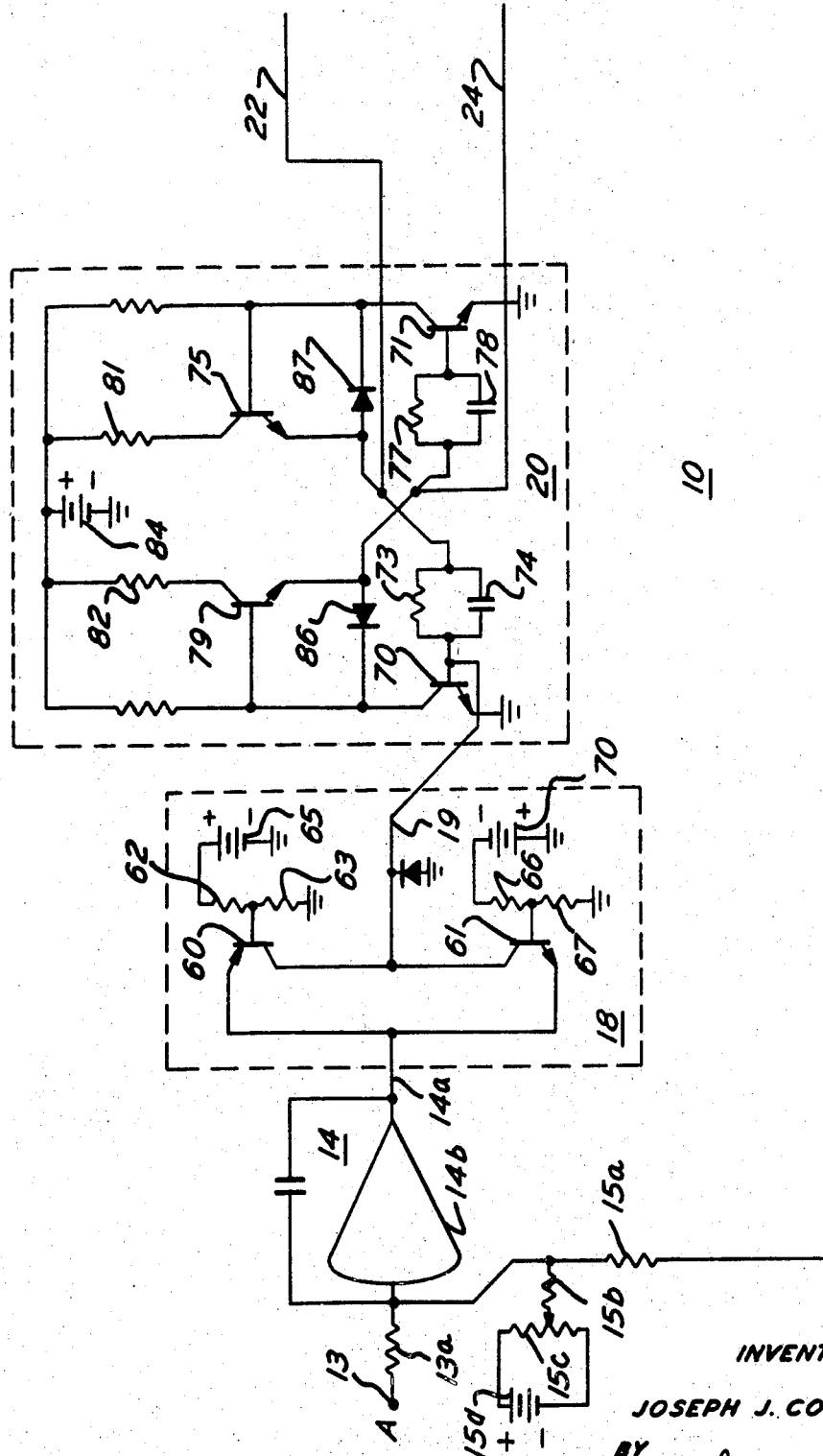

United States Patent Office 3,466,460
Patented Sept. 9, 1969

3,466,460
TIME DIVISION MULTIPLIER
Joseph J. Connolly, Feasterville, Pa., assignor to Weston Instruments, Inc., Newark, N.J., a corporation of Delaware
Filed Jan. 20, 1967, Ser. No. 610,607
Int. Cl. G06g 7/12; H03k 19/08, 3/26
U.S. Cl. 307—229           11 Claims

ABSTRACT OF THE DISCLOSURE

A four quadrant time division multiplier utilizing combined pulse-height and pulse-width modulation of a series of pulses with the average height of the pulses being proportional to the product of two voltage variables. The modulator of the pulse-width comprises an integrator, a flip-flop and a pair of level changers and drivers. The modulator of the pulse-height includes a field effect transistor which is switched by the pulse-width modulator.

---

Figure 1:
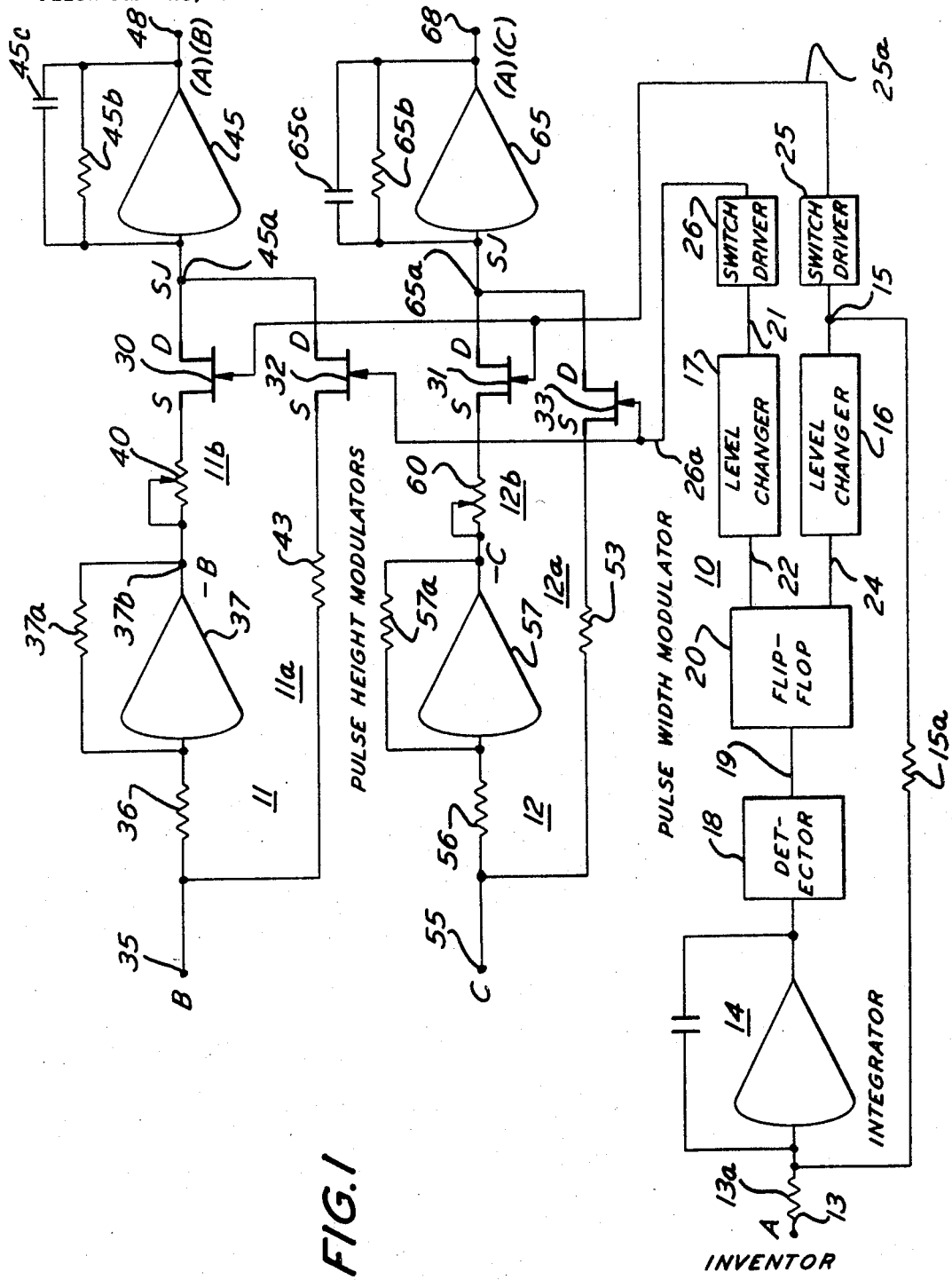

This invention pertains to the field of art of time division multipliers utilizing combined pulse-height and pulse-width modulation of a series of rectangular pulses. A first of the voltage variables A to be multiplied is applied to a pulse-width modulator which generates rectangular pulses with the width of each pulse being a function of voltage variable A. The series of pulses is applied to a pulse-height modulator which modulates the height of each pulse proportional to the magnitude of a second voltage variable B to be multiplied. The average height of the series of pulses is proportional to the product of variable A times variable B which average height is determined by integrating the series of pulses.

It has heretofore been desired to multiply a first variable A by a second variable B and to also multiply the first variable by a third variable C. Such multiplication using one common variable is provided by a single pulse-width modulator and a B and a C pulse-height modulator having variable voltages B and C applied thereto respectively. Thus, the desired product $A \times B$ is recovered from the B pulse-height modulator by a respective averaging filter and the product $A \times C$ is recovered from the C pulse-height modulator by a respective averaging filter.

Prior time division multipliers which provide the foregoing products, $A \times B$ and $A \times C$, have required substantially complex circuitry in order to achieve a high frequency response. If the circuitry were simplified, the resultant multiplier could not provide an effective frequency response above 1,000 cycles for example. In addition, the overall accuracy of such prior multipliers was not suitable for commercial use without the costly and time consuming requirement of matching components. Further, in prior multipliers, the B and C pulse-height modulators have used diode switches in which the diodes have been required to be individually selected in order to provide a switch which would not introduce substantial noise.

Accordingly, an object of the invention is a time division multiplier of substantially simple construction which does not utilize diode switches in the pulse-height modulators.

In accordance with the present invention, a four quadrant time division multiplier has been developed which uses field effect transistors in the pulse-height modulators. The transistors are accurately driven to their on state and their off state by the pulse-width modulator thereby to provide a system which has a substantially high frequency response and is of substantially simple construction. More particularly, in carrying out the present invention in one form thereof, the pulse-width modulator comprises in series circuit, an integrator, a level detector, a flip-flop and a first and second level changer circuit and a first and a second switch driver circuit. Variable voltage A is summed with an output of the second changer circuit and applied to the integrator which produces substantially linear voltage ramps of positive and negative slope. The level detector applies a signal to switch the stable state of the flip-flop when the voltage ramps reach a predetermined positive and a predetermined negative potential. The first changer circuit is connected to the output of the flip-flop which produces pulses having the inverted polarity direction as the ramps for inverting the polarity of the flip-flop signals. The second level changer circuit is connected to the output of the flip-flop which produces pulses having the same polarity direction as the ramps for inverting the polarity of the flip-flop signals.

There is further provided a B and C pulse-height modulator each comprising an inverter and an averaging filter with a first and a second field effect transistor for each of the modulators. Each first transistor is connected between a corresponding modulator input and an input of corresponding filter and each second transistor is connected between an output of a corresponding inverter and a corresponding filter input. The first driver is connected to the gate of both first transistors and the second driver is connected to the gate of both second transistors. In this manner, the first and second transistors are alternately driven on and off in accordance with the series of pulses produced by the pulse-width modulator. Accordingly, the B modulator produces an output signal proportional to the product of $A \times B$ and the C modulator produces an output signal proportional to the product of $A \times C$. Thus, in accordance with the invention, the multiplier is of simple construction having a substantially high frequency response and substantially high accuracy.

Figure 2B:
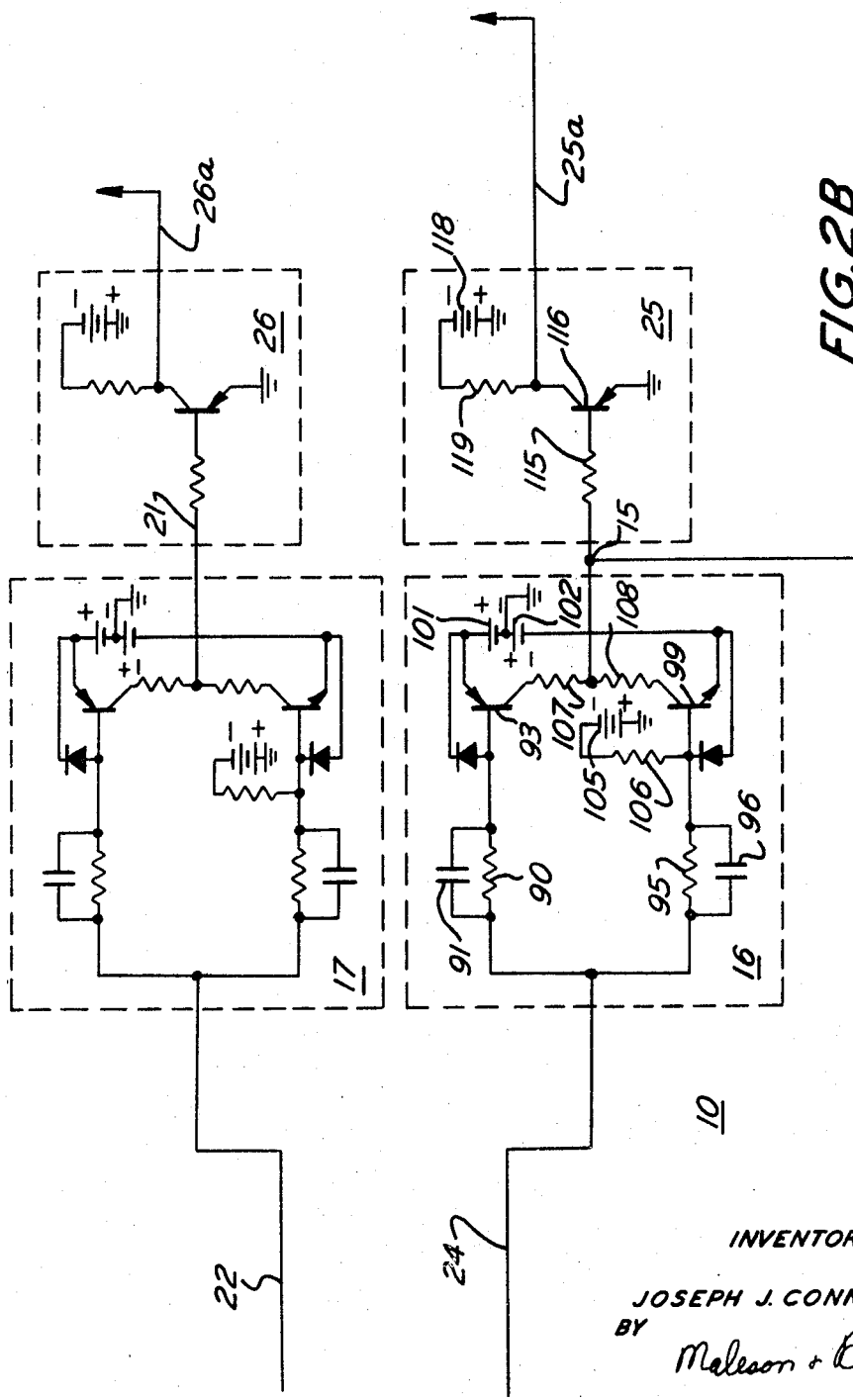
Figure 3A:
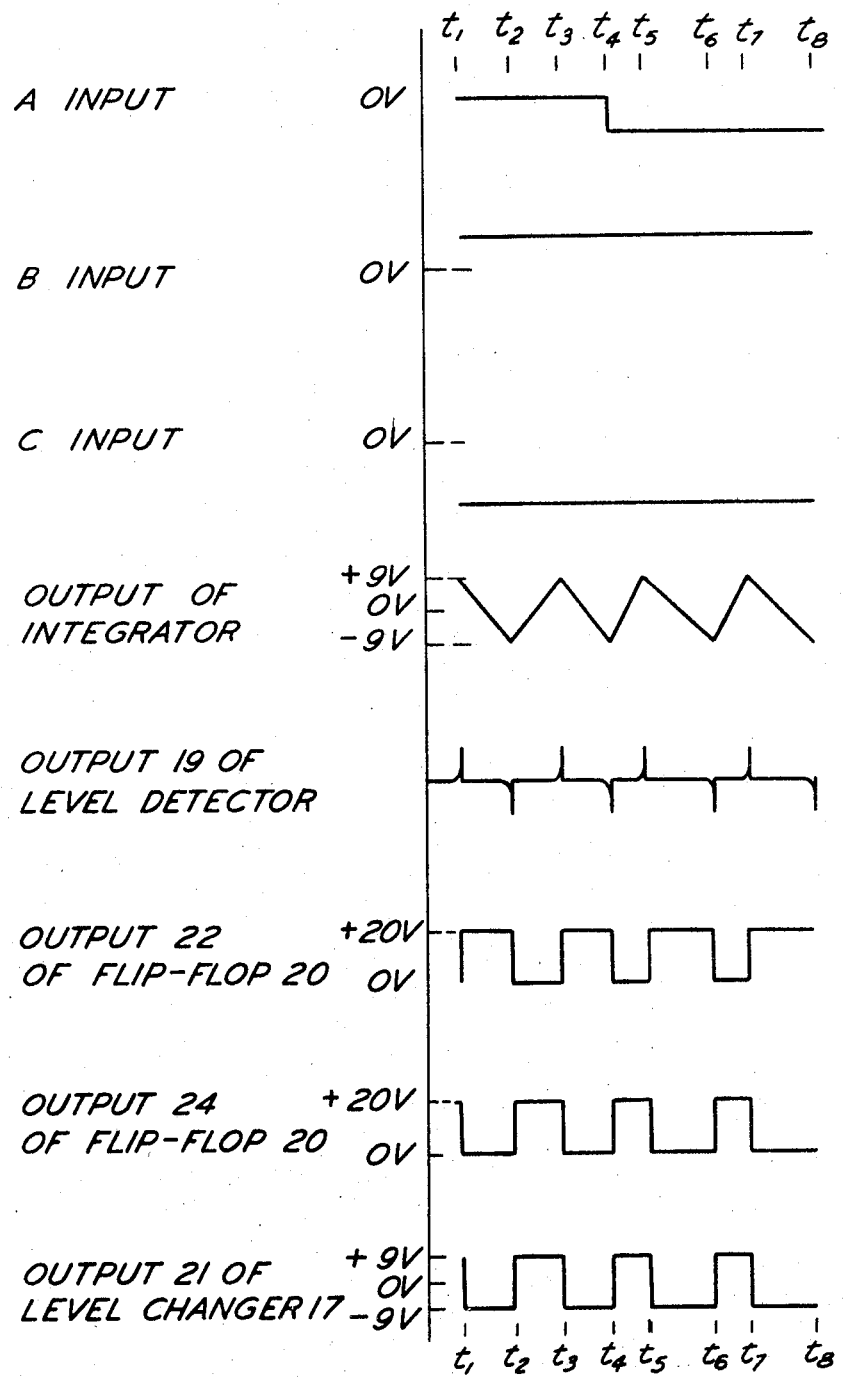
Figure 3B:
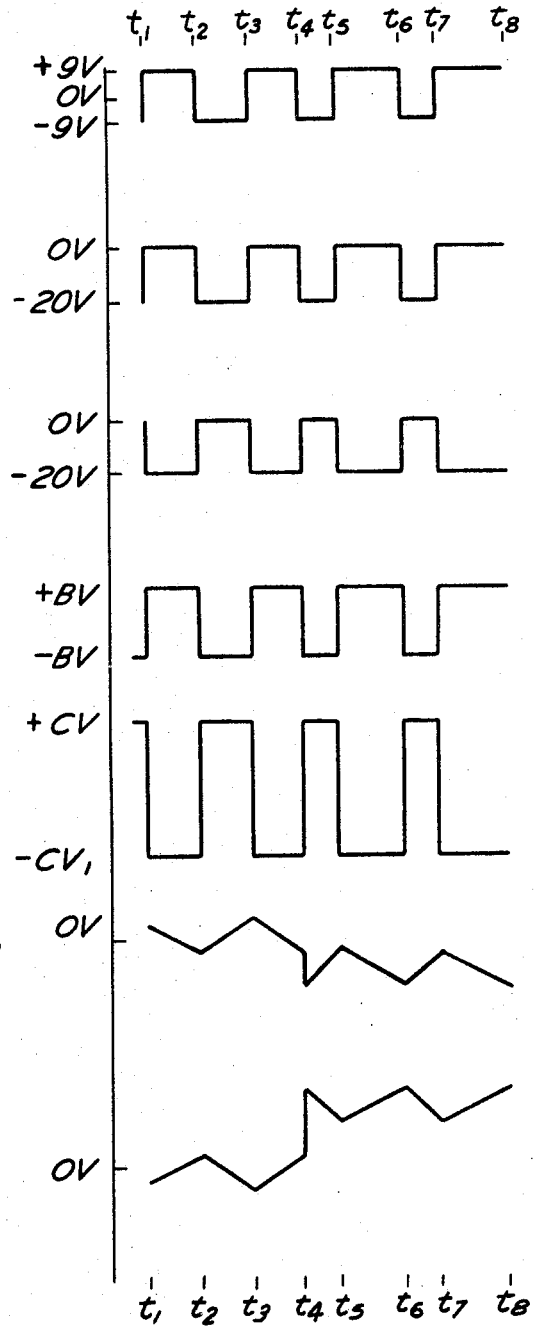

For further objects and advantages of the invention and for a typical embodiment thereof, reference is to be had to the following description taken in conjunction with the accompanying drawings, in which:

FIG. 1 is a block diagram of a time division multiplier in accordance with a particular form of the invention;

FIGS. 2A and 2B taken together schematically illustrate in detail the pulse-width modulator of FIG. 1; and FIGS. 3A and 3B taken together illustrate waveforms taken at various points in the multiplier of FIG. 1.

Referring now to FIG. 1, there is shown a four quadrant time division multiplier for variables A, B and C to provide a product $A \times B$ and a product $A \times C$ in which the variables may have positive or negative values in any combination. The multiplier comprises a pulse-width modulator 10 and a pair of pulse height modulators 11 and 12. Pulse-width modulator 10 provides a series or chain of pulses at a pulse repetition rate in which the width of each pulse is a function of the voltage magnitude of variable A. The chain of pulses is applied to each of the pulse-height modulators 11 and 12 with variable B applied to modulator 11 and variable C applied to modulator 12.

For B modulator 11, the height of each of the chain of pulses is made proportional to the voltage value of variable B. Accordingly, the average height of the series of pulses is proportional to the product of $A \times B$. Similarly, for C modulator 12, the height of each of the pulses of the chain is made proportional to the voltage value of the variable C and the average height of the series of pulses is then proportional to the product of $A \times C$.

It will now be understood that modulator 10 controls the duty cycle of a chain of pulses as a function of the magnitude of input variable A. Thus, if A is assumed to have a value equal to 0, then modulator 10 produces a chain of symmetrical pulses. With $A=0$, the value of each of the products $A \times B$ and $A \times C$ will then also be equal to 0, no matter what the value of B and C.

Modulator 10 comprises in series circuit an integrator 14, a level detector 18 and a flip-flop 20 having its outputs connected to level changers 16 and 17 respectively. The input variable A is applied to input terminal 13 which is connected to the input of integrator 14. As shown in FIG. 3 for the assumed condition, the magnitude of the potential of variable A is equal to 0 from time $t_1$ until time $t_4$. At time $t_1$, a positive going feedback signal is produced at feedback output 15 of level changer 16 and applied by way of a resistor 15a to the input of integrator 14. Thus, the resultant input to integrator 14 is equal to the positive going signal from output 15 plus the zero potential (equal to the signal from output 15) to provide a linear voltage ramp of negative slope from time $t_1$ until time $t_2$.

At time $t_2$, the output of integrator 14 reaches a predetermined negative potential as for example, −9 volts which is effective to produce a negative going signal from level detector 18 shown as a spike. The output of detector 18 is applied to flip-flop 20 to trigger that flip-flop from its existing stable state to the other of its stable states. Accordingly, output 24 of flip-flop 20 is switched to provide a positive going signal while output 22 provides a negative going signal is illustrated in FIG. 3. Thus, output 24 provides a pulse in the same polarity direction (positive) and output 20 provides the inverted polarity direction (negative) as the ramp between times $t_2$–$t_3$. The positive going signal applied by way of output 24 produces a negative going signal from level changer 16 at its output 15 which is applied as an input to integrator 14 together with the zero potential of input A. Thus, at time $t_2$ the integrator begins to integrate the applied negative going signal of feedback output 15 to produce a linear voltage ramp of positive slope between times $t_2$ and $t_3$.

At time $t_3$ the output of integrator 14 reaches a predetermined positive potential as for example, +9 volts which is effective to produce a positive output from level detector 18. In manner similar to that described above, flip-flop 20 is switched so that a negative going signal appears at output 24 (the same polarity direction as the ramp between $t_3$–$t_4$) while a positive going signal appear at output 22, (the inverted polarity direction as the ramp). The negative going signal applied to level changer 16 is effectively reversed and appears at output 15 as a positive going signal which is applied to the input of integrator 14.

There has now been described one cycle of modulator 10 for a zero magnitude input variable A. Accordingly, the negative slope ramp between times $t_1$ and $t_2$ is equal in time duration and slope to the positive slope ramp between times $t_2$ and $t_3$. Thus, the outputs of level changers 16 and 17 are square waves having identical on and off times, viz. identical times of positive and negative going pulses.

The square waves from level changers 16 and 17 are respectively applied to switch drivers 25 and 26. The driver output of driver 25 is applied to the gates of field effect transistors 30 and 31. Similarly, the driver output of driver 26 is applied to the gates of field effect transistors 32 and 33. Transistors 30 and 32 are associated with pulse-height modulator 11 while transistors 31 and 33 are associated with modulator 12.

Each of the modulators 11 and 12 have a positive side, 11a and 12a respectively, and a negative side, 11b and 12b respectively. More specifically, the B variable voltage is applied to an input terminal 35 of modulator 11 and is transmitted by way of a resistor 36 to an input of a direct coupled operational amplifier 37 having a feedback resistor 37a connected between its input and output. Amplifier 37, on the −B side, 11b, of modulator 11 inverts the B variable voltage to provide at amplifier output terminal 37b a voltage exactly equal to the potential at input terminal 35 but opposite in sign. This −B potential is applied by way of a variable resistor 40 to a source terminal of transistor 30 while a drain terminal thereof is connected to a summing junction 45a of a direct coupled operational amplifier 45.

Similarly, input terminal 35 is connected by way of a resistor 43 on the +B side, 11a, of modulator 11, to a source terminal of transistor 32. A drain terminal of transistor 32 is connected to summing junction 45a. When the output potential of driver 26 is in a positive going direction, transistor 32 is turned on the input variable B is applied to summing junction 45a. On the other hand, when the output potential of driver 25 is in a positive going direction, transistor 30 is turned on and the inverted input B is applied to junction 45a.

Amplifier 45 has connected between its output and input terminals a parallel combination of a resistor 45b and a capacitor 45c of value to provide an averaging circuit or filter. Thus, the average of the input signals applied at summing junction 45a is produced at output terminal 48 of amplifier 45. In this manner, the output of averaging amplifier 45 provides the true algebraic multiplication of the magnitude of the variables A and B.

It will be assumed that variable B is of positive sign and of magnitude illustrated in FIG. 3. As previously assumed between times $t_1$ and $t_4$, $A=0$ and square waves are applied to transistors 30 and 32. This waveform is modulated in amplitude by the voltage value of +B for both positive and negative excursions as shown in FIG. 3. However, since the resultant positive pulse is equal in time duration to the negative pulse, the averaged value at output terminal 48 is substantially equal to zero potential. This is a correct result for the product in which variable A equals 0.

It will now be assumed that at time $t_4$, A has a predetermined magnitude and is of negative sign. Accordingly, at time $t_4$, the resultant input to integrator 14 is the summation of the voltage −A plus the negative going output 15 of level changer 16. Thus, the resultant input to integrator 14 has a negative magnitude greater than output 15 alone and greater than when $A=0$. Accordingly, integrator 14 integrates at a faster rate to reach the predetermined value determined by detector 18, which results in a steeper slope ramp. In this manner, a larger magnitude resultant input to integrator 14 is effective to generate a spike (time $t_5$) more rapidly than in the $A=0$ condition.

At the time of the spike $t_5$, flip-flop 20 is switched and modulator 10 produces switching pulses to the modulators 11 and 12 as shown in FIG. 3. In addition, at time $t_5$, a positive going pulse is applied by way of output 15 which is summed with the negative input A to produce a resultant signal of lower magnitude than when $A=0$. This resultant lower magnitude potential is integrated at a slower rate so that it takes an increased amount of time for the integrator output to reach the predetermined level.

At time $t_6$, flip-flop 20 is switched and modulator 10 produces switching pulses to modulators 11 and 12 and a negative going pulse at output 15. Thus, from time $t_4$ to time $t_6$, one complete cycle is traversed and at time $t_6$, a new cycle begins with a positive slope ramp as previously described with respect to time $t_4$. The resultant wave shape between times $t_4$ and $t_6$ at summing junction 45a is shown in FIG. 3. It will be seen that the negative going portion of the waveform between times $t_4$ and $t_5$ is of shorter time duration than the positive going portion between times $t_5$ and $t_6$. These waveforms are averaged and inverted by averager 45 to produce a resultant averaged wave shape shown in FIG. 3 of negative potential. This negative resultant potential is equal to the product of variable −A × variable B.

Pulse height modulator 12 includes identical circuit elements as modulator 11 and need not be described in detail. Input variable C is applied to an input terminal 55 having a negative voltage value shown in FIG. 3. As previously described, between times $t_1$ and $t_4$, $A=0$ and square waves produced by modulator 10 are applied to transistors 31 and 33. These wave forms are modulated in amplitude by variable —C for both positive and negative excursions. More particularly, between times $t_1$ and $t_2$, transistor 33 is on and variable —C is applied to summing junction 65a. Between times $t_2$ and $t_3$, transistor 31 is on and the inverted value of —C, viz. +C, is applied to junction 65a. However, since the resultant negative pulse is equal in time duration to the positive pulse, the average value at output terminal 68 is substantially equal to zero potential which is a correct result for the product in which variable $A=0$.

At time $t_4$, variable A assumes a negative value and drivers 25 and 26 produce the wave shapes shown in FIG. 3. Thus, transistor 31 is turned on between times $t_4$ and $t_5$, thereby to pass +C to summing junction 65a. Between times $t_5$ and $t_6$, transistor 33 is on and the input —C is transmitted to the junction 65a. Accordingly, between times $t_4$ and $t_6$, the negative going signal at junction 65a is longer in time duration than the positive going signal to provide an averaged negative going signal at the summing junction. This signal is inverted by averager 65 to provide a resultant output signal at terminal 68 shown in FIG. 3, having a positive value which is correct for the product of $-A \times -C$.

From the foregoing examples, it will be understood that input variables A, B and C may be positive or negative in sign in any combination. Specifically, if variable A is of positive sign, then the positive slope ramp at the output of integrator 14 will be longer in time duration than the negative slope ramp with the wave shapes illustrated in FIG. 3 being similarly modified.

Referring now to FIG. 2, there is shown the detailed circuitry of pulse width modulator 10. As previously described, output 14a of integrator 14 is connected to the input of level detector 18 which comprises a pair of transistors 60 and 61 of the PNP and NPN type respectively. Output 14a is connected to the emitters of transistors 60 and 61 with the collectors thereof being connected together and forming the output 19 of detector 18. Biasing supplies are connected to the bases of switching transistors 60 and 61 with the base of transistor 60 being connected to a common junction of voltage divider resistors 62 and 63. The other side of resistor 62 is connected to the positive side of a battery 65 and the other side of resistor 63 is connected to ground. Similarly, the base of transistor 61 is connected to a common junction of resistors 66 and 67 with the other side of resistor 66 being connected to the negative side of a battery 68 and the other side of resistor 67 being connected to ground.

Accordingly, batteries 65, 68 and resistors 62, 63 and 66, 67 are selected of value so that transistors 60 and 61 conduct at a desired potential. Specifically, the positive bias on transistor 60 is selected so that between times $t_2$ and $t_3$, transistor 60 conducts when the positive going ramp reaches the predetermined positive potential, as for example +9 volts. At that time, the positive potential of battery 65 may be traced by way of conductive transistor 60 through output 19 to the base of a switching transistor 70 of flip-flop 20 thereby to switch the stable state of that flip-flop. Similarly, between times $t_1$ and $t_2$, when the negative slope ramp reaches a predetermined negative potential, as for example —9 volts, the bias on transistor 61 is selected so that it is rendered conductive. At that time the negative potential of battery 68 may be traced by way of conductive transistor 61 through output 19 to transistor 70 thereby to switch flip-flop 20.

Flip-flop 20 comprises a pair of cross-connected switching transistors 70 and 71 both of the NPN type. A first of the cross-connections may be traced from the base of transistor 70 through a parallel combination of a resistor 73 and a capacitor 74 and then through the emitter-base junction of an emitter follower transistor 75 to the collector of transistor 71. Similarly, a second of the cross-connections may be traced through a parallel combination of a resistor 77 and a capacitor 78 and through the emitter-base junction of an emitter follower transistor 79 to the collector of transistor 70. Transistors 75 and 79 are of the NPN type and are each connected as an emitter follower with the collectors thereof connected by way of resistors 81 and 82 respectively to the positive side of the battery 84. Similarly, the collectors of transistors 70 and 71 are respectively connected to the positive side of battery 84. For proper operation of flip-flop 20, diodes 86 and 87 are respectively connected between the emitter and base of transistors 79 and 75.

Between times $t_1$ and $t_2$, flip-flop 20 is in a first of its stable states in which transistor 70 is on or substantially conductive and transistor 71 is off or substantially nonconductive. As previously described, at time $t_2$, transistor 61 is turned on and the negative potential of battery 68 is applied to the base of NPN transistor 70 thereby tending to turn off that transistor. With transistor 70 being turned off, a signal is applied by way of the first cross-connection to turn on transistor 71 which produces a signal applied by way of the second cross-connection tending to further turn off transistor 70. Accordingly, flip-flop 20 is switched from its first to a second of its stable states. At time $t_3$, a transistor 60 is turned on and the positive potential of battery 65 is applied to the base of transistor 70 thereby tending to turn that transistor on. With transistor 70 being turned on, flip-flop 20 is switched back from its second to the first of its stable states.

The first cross-connection is coupled to first flip-flop output 22 which is applied to the input of first level changer 17. The second cross-connection is connected to second output 24 which is applied to an input of second level changer 16. It will be understood that the signals on outputs 22 and 24 change in potential between ground potential and a positive potential with respect to ground, as for example +20 volts. These signals are inverted by level changers 16 and 17 into waveforms varying with respect to ground between a positive and a negative potential of equal magnitude as for example +9 volts and —9 volts.

Level changers 16 and 17 are of identical construction and only one of them, level changer 16 need be described in detail. Specifically, flip-flop output 24 is connected by way of a parallel combination of an input resistor 90 and a speed-up capacitor 91 to the base of a normally conductive PNP switching transistor 93. In addition, output 24 is also connected by way of a parallel combination of an input resistor 95 and a speed-up capacitor 96 to the base of a normally nonconductive transistor 99. Transistor 99 is maintained normally off by a battery 105, having its negative side connected by way of a resistor 106 to the base of transistor 99.

In operation of level changer 16, between times $t_1$–$t_2$, a negative going signal is applied by way of conductor 24 which is in a direction to reinforce the normally on and normally off states of transistors 93 and 99 respectively. Accordingly, the positive side of a battery 101 may be traced through the emitter base and collector of conductive transistor 93 and by way of a resistor 107 to the output terminal 15 of changer 16. Thus, a negative going input signal to changer 16 produces a positive potential output signal.

On the other hand, between times $t_2$ and $t_3$, with a positive going input signal to changer 16, transistor 93 is turned off and transistor 99 is turned on since the positive potential input with respect to ground is sufficient to overcome the negative potential of battery 105. Accordingly, with transistor 9 on, the negative side of a battery 102 may be traced by way of the emitter, base and collector of conductive transistor 99 through a resistor 108 to output terminal 15. It will now be understood that the input waveform to changer 16 varying between a positive potential and ground, is inverted to form a similar waveform at terminal 15 which varies between a positive potential of battery 101 and a negative potential of battery 102 with respect to ground potential.

Output terminal 15 is connected by way of a resistor 15a and through a resistor 15b to a biasing potentiometer 15c having one side connected to a positive side of a battery 15d and its other side connected to the negative side thereof, to the input of integrator 14. As previously described, at time $t_1$ for example, the negative going output signal of output 15 is summed with the input variable A applied to terminal 13 connected through an input resistor 13a to integrator amplifier 14b. When, at time $t_2$, the positive slope ramp produced by integrator 14 reaches a potential sufficient to turn on transistor 60, the positive potential of battery 65 is applied to flip-flop 20. That positive potential is applied for a substantially very short time duration since transistor 60 is turned off immediately after time $t_2$ as a result of the positive going output signal from terminal 15. Thus, at time $t_2$, the output of detector 18 appears as a negative going spike. The negative going spikes at times $t_2$, $t_4$, $t_6$ and $t_8$ and the positive going spikes at times $t_1$, $t_3$, $t_5$ and $t_7$ may be similarly explained.

The output of changer circuit 16 is applied to switch driver 25, to produce driving or switching pulses for the gates of transistors 30 and 31. Specifically, output terminal 15 is applied by way of a resistor 115 to the base of a PNP transistor 116, the emitter of which is grounded. Between times $t_1$ and $t_2$, the positive output potential at terminal 15 is effective to turn off transistor 116. Thus, the negative side of a collector supply 118 may be traced by way of a resistor 119 to output 25a of driver 25. This negative potential with respect to ground is effective to drive off transistors 30 and 31. On the other hand, between times $t_2$ and $t_3$, the negative output potential of output 15 is effective to turn on transistor 116 thereby to effectively ground output terminal 25a. Thus, between times $t_2$ and $t_3$, transistors 30 and 31 are driven on. The foregoing continues for turn on of transistors 30 and 31 between times $t_4$–$t_5$, $t_6$–$t_7$ and turn off of these transistors between times $t_3$–$t_4$, and $t_5$–$t_6$. The output of driver 26 at terminal 26a is the inverse of the signals at terminal 25a with transistors 32 and 33 being driven on by the application of ground potential between times $t_1$–$t_2$, $t_3$–$t_4$, $t_5$–$t_6$ and these transistors being driven off by the application of a negative potential between times $t_2$–$t_3$, $t_4$–$t_5$ and $t_6$–$t_7$.

The structure and operation of driver 26 is identical with that of driver 25.

It will now be understood that each level changer circuit 16, 17 is effective to apply a signal by way of a respective switch driver 25, 26 to drive the corresponding field effect transistors on and to drive the transistors off. By utilizing a level changer and a driver to drive the field effect transistor on and off, there is provided a good rise time and a good decay time for the switching function. In this manner, there is achieved a pulse-width pulse-height modulation of substantially high frequency response and substantially high overall accuracy without the requirement of matching of components and without the use of diode switches. In particular, the resultant system is relatively simple in construction.

It will be understood by those skilled in the art that the above described embodiment is meant to be merely exemplary and that it is susceptible of modification and variation without departing from the spirit and scope of the invention.

What is claimed is:

1. A four quadrant time division multiplier for multiplying a voltage variable A times a voltage variable B and for multiplying voltage variable A times a voltage variable C comprising, integrator means for summing voltage A and a feedback signal and for integrating the resultant signal to provide substantially linear voltage ramps of positive and negative slope, level detector means connected to an output of said integrator means for producing switching signals when said ramps reach a predetermined positive and a predetermined negative potential, said detector means connected to bistable means for application thereto of said switching signals to switch the stable state of said bistable means, first and second driving means respectively connected to differing outputs of said bistable means for changing the level of the corresponding bistable means output signals for providing (1) at a feedback output a feedback signal for application to said integrator means and (2) at a pair of driver outputs a series of pulses in which the width of each of the pulses is a function of said voltage A, voltage variable B being applied to an input of a first inverter means in series circuit with a first averaging amplifier and voltage variable C being applied to a second inverter means in series circuit with a second averaging amplifier, and a first and a second field effect transistor for each of said series circuits, said first transistor being connected between respective inputs of said first and second inverter means and respective inputs of said first and second averaging amplifiers and said second transistors being connected between respective outputs of said first and second inverter means and respective inputs of said first and second averaging amplifiers, a first of said driver outputs being connected to a gate electrode of both first transistors and a second of said driver outputs being connected to a gate electrode of both second transistors whereby said first averaging amplifier produces an output signal proportional to the product of $A \times B$ and said second averaging amplifier produces an output signal proportional to $A \times C$.

2. The time devision multiplier of claim 1 in which each of said first and second driving means comprises (1) a first and second level changer circuit respectively for inverting the respective output of said bistable means and, (2) a first and second switch driver circuit respectively for driving the corresponding first and second transistors on and off.

3. The time division multiplier of claim 2 in which said second changer circuit includes said feedback output and is connected to the output of said bistable means which produces pulses having the same polarity direction as said ramps and said first changer circuit is connected to the output of said bistable means which produces pulses having the inverted polarity direction as said ramps whereby said first and second transistors are turned on and off respectively when said ramp has a negative slope and said first and second transistors are turned off and on respectively when said ramp has a positive slope.

4. A four quadrant time division multiplier for multiplying a first voltage variable times a second voltage variable comprising a pulse width modulator for producing a series of pulses in which the width of each pulse is a function of said first voltage variable comprising an integrator, a level detector, a flip-flop and a first and a second level changer circuit, said integrator including means for summing said first voltage variable and an output of said second changer circuit for producing substantially linear voltage ramps of positive and negative slope, said level detector being connected to the output of said integrator and to an input of said flip-flop for applying a signal to switch the stable state of said flip-flop when said positive and negative slope ramps reach a predetermined positive and negative potential, a second output of said flip-flop producing pulses having an inverted polarity direction as of said ramps, said first and second flip-flop outputs being respectively connected to said first and second changer circuits for inverting the polarity and changing the level of the corresponding flip-flop output signals, the outputs of said first and second changer circuits being respectively connected to first and second driver means each for producing said series of pulses, a pulse height modulator for modulating the height both in the positive and negative directions of said series of pulses proportional to a second voltage variable comprising an inverter and an averaging filter with said second voltage variable being applied to an output of said inverter, a first field effect transistor being connected to said inverter input and an input of said filter and a second field effect transistor being connected between an output of said inverter and an input of said filter, said first driver means being connected to a gate of said first transistor and said second driver means being connected to a gate of said second transistor whereby the output of said filter produces an output signal proportional to the product of said first and second voltage variables.

5. The time division multiplier of claim 4 in which each of said first and second changer circuits comprises a PNP and an NPN transistor, a positive source of supply connected to the emitter of said PNP transistor and a negative source of supply connected to the emitter of said NPN transistor, resistance means connected to the collectors of said NPN and PNP transistors for providing said output for said level changer circuit.

6. A four quadrant time division multiplier for multiplying a voltage variable A times a voltage variable B and for multiplying a voltage variable A times a voltage variable C comprising, integrator means for summing voltage A and a feedback signal and for integrating the resultant signal to provide substantially linear voltage ramps of positive and negative slope, level detector means connected to an output of said integrator means for producing switching signals when said ramps reach a predetermined positive and a predetermined negative potential, a flip-flop connected to said detector means for application to said flip-flop of said switching signals to switch the stable state of said flip-flop, first and second level changer circuits respectively connected to differing outputs of said flip-flop for inverting the polarity and changing the level of the corresponding flip-flop output signals, the output of said second changer circuit being connected to said integrator means for providing said feedback signal, first and second driver means respectively connected to said first and second changer circuits for producing at outputs thereof series of pulses in which the width of each of the pulses is a function of said voltage A, a first and a second pulse height modulator for modulating the height of said series of pulses proportional to voltage variable B and to voltage variable C respectively, each of said height modulators comprising an inverter and an averaging filter with voltage variables B and C being applied to an input of a corresponding inverter, and a first and a second field effect transistor for each of said first and second modulators with each said first transistor being connected between a corresponding modulator input and an input of a corresponding filter and with each said second transistor being connected between an output of a corresponding inverter and a corresponding filter input, said first driver means being connected to an input terminal of both first transistors and said second driver means being connected to a gate of both second transistors for switching said first and second transistors on and off in accordance with driving potential from said driver means whereby said first modulator produces an output signal proportional to the product of $A \times B$ and said second modulator produces an output signal proportional to the product of $A \times C$.

7. The time division multiplier of claim 6 in which said second changer circuit being connected to the output of said flip-flop which produces pulses having the same polarity direction as said ramps and said first changer circuit being connected to the output of said flip-flop which produces pulses having the inverted polarity direction as said ramps.

8. The time division multiplier of claim 7 in which each of said first and second level changer circuits comprises, a PNP and an NPN transistor, a positive source of supply connected to the emitter of said PNP transistor and a negative source of supply connected to the emitter of said NPN transistor, resistance means connected to the collectors of said NPN and PNP transistors for providing said output for said level changer circuit whereby said changer circuits apply signals by way of said driver to turn on and turn off said transistors.

9. The time division multiplier of claim 6 in which for each first transistor, the source terminal is connected to said corresponding modulator input and the drain terminal is connected to said corresponding filter input and for each second transistor, the source terminal is connected to said corresponding inverter output and the drain terminal is connected to said corresponding filter input.

10. A four quadrant time division multiplier for multiplying a voltage variable A times a voltage variable B and for multiplying a voltage variable A times a voltage variable C comprising, a pulse width modulator for producing a series of pulses at a pulse repetition rate in which the width of each pulse is a function of voltage A comprising in series circuit, an integrator, a level detector, a flip-flop and a first and second level changer circuit connected to differing outputs of said flip-flop, means for summing voltage A and an output of said second level changer and applying the resultant signal to said integrator whereby the rate of integration is proportional to the magnitude of said resultant signal to provide substantially linear voltage ramps of positive and negative slope, said level detector applying a signal to switch the stable state of said flip-flop when said voltage ramps reach a predetermined positive and a predetermined negative potential, said second level changer circuit being connected to the output of said flip-flop which produces pulses having the same polarity direction as said ramps for inverting the polarity and changing the level of the flip-flop output signals, said first changer circuit connected to the output of the flip-flop which produces pulses having the inverted polarity direction as said ramps for inverting the polarity and changing the level of the flip-flop output signals, a first and a second pulse height modulator for modulating the height of both in the positive and negative going directions of said series of pulses proportional to voltage variable B and voltage variable C respectively, said first modulator including a first inverter having said voltage B applied to an input thereof and a first averaging filter, a first field effect transistor connected between said first inverter input and an input of said first filter and a second field effect transistor connected between the output of said first inverter and said input of said first filter, said second modulator including a second inverter having said voltage C applied to an input thereof and a second averaging filter, a third field effect transistor connected between said inverter input and an input of said second filter and a fourth field effect transistor connected between an output of said second inverter and said second filter input, and a first driver circuit connected between an output of said first changer circuit and the gate of said first and third transistors and a second driver circuit connected between said output of said second changer circuit and a gate of said second and fourth transistor whereby said first modulator produces an output signal proportional to the product of $A \times B$ which is the average height of the series of pulses applied to said first filter and said second modulator produces an output signal proportional to the product of $A \times C$ which is the average height of series of pulses applied to said second filter.

11. The time division multiplier of claim 10 in which the source terminal is connected to a corresponding modulator input and the drain terminal is connected to a corresponding filter input and for each second and fourth transistor, the source terminal is connected to a corresponding inverter output and the drain terminal is connected to a corresponding filter input.

References Cited

UNITED STATES PATENTS 3,368,066    2/1968    Miller et al. _ _ _ _ _ _ 328—160 X DONALD D. FORRER, Primary Examiner U.S. Cl. X.R.

235—194; 307—205, 235, 292; 328—160